(12) United States Patent
Kuwahara et al.

(10) Patent No.: US 11,961,677 B2
(45) Date of Patent: Apr. 16, 2024

(54) CAPACITOR MODULE AND POWER CONVERSION APPARATUS

(71) Applicant: DENSO CORPORATION, Kariya (JP)

(72) Inventors: Mamoru Kuwahara, Kariya (JP); Yuta Hashimoto, Kariya (JP); Kazuya Takeuchi, Kariya (JP)

(73) Assignee: DENSO CORPORATION, Kariya (JP)

(*) Notice: Subject to any disclaimer, the term of this patent is extended or adjusted under 35 U.S.C. 154(b) by 90 days.

(21) Appl. No.: 17/870,189

(22) Filed: Jul. 21, 2022

(65) Prior Publication Data

US 2022/0359119 A1 Nov. 10, 2022

Related U.S. Application Data

(63) Continuation of application No. PCT/JP2020/048079, filed on Dec. 23, 2020.

(30) Foreign Application Priority Data

Jan. 24, 2020 (JP) ................. 2020-009697

(51) Int. Cl.
*H01G 4/228* (2006.01)
*H01G 2/08* (2006.01)
*H01G 4/224* (2006.01)
*H02M 7/48* (2007.01)

(52) U.S. Cl.
CPC ............ *H01G 4/228* (2013.01); *H01G 2/08* (2013.01); *H01G 4/224* (2013.01); *H02M 7/48* (2013.01)

(58) Field of Classification Search
CPC .......... H01G 4/228; H01G 2/08; H01G 4/224; H01G 2/02; H01G 2/10; H01G 4/38; H02M 7/48; H02M 7/5387; H02M 7/003
See application file for complete search history.

(56) References Cited

U.S. PATENT DOCUMENTS

| 5,548,473 | A | * | 8/1996 | Wang ..................... H01G 4/224 |
| | | | | 361/519 |
| 6,118,646 | A | * | 9/2000 | Yang ..................... H01G 4/228 |
| | | | | 361/519 |
| 6,400,551 | B1 | * | 6/2002 | Lin ......................... H01G 2/106 |
| | | | | 361/308.1 |
| 11,282,649 | B2 | * | 3/2022 | Takeoka ................ H01G 4/224 |
| 2013/0108915 | A1 | * | 5/2013 | Fukuda ................ H01M 50/193 |
| | | | | 429/211 |
| 2015/0255217 | A1 | | 9/2015 | Nishiyama |
| 2017/0053744 | A1 | * | 2/2017 | Ichinose ................... H01G 4/33 |
| 2020/0118762 | A1 | * | 4/2020 | Takeoka ................ H01G 4/236 |

(Continued)

FOREIGN PATENT DOCUMENTS

| CN | 110718389 A | * | 1/2020 |
| JP | 2006-210561 A | | 8/2006 |
| JP | 2008-053635 A | | 3/2008 |

(Continued)

*Primary Examiner* — Dion R. Ferguson
(74) *Attorney, Agent, or Firm* — Oliff PLC (57) ABSTRACT

A capacitor module includes a capacitor element, a plurality of connection terminals for electrically connecting the capacitor element to a semiconductor module and a power supply that are another equipment, and an exterior coating that includes a resin film having electrical insulating property and wraps the capacitor element except the plurality of connection terminals.

5 Claims, 7 Drawing Sheets

(56) References Cited

U.S. PATENT DOCUMENTS

2022/0359119 A1* 11/2022 Kuwahara .............. H01G 4/224

FOREIGN PATENT DOCUMENTS

| JP | 2013-197267 A | 9/2013 | | |
|----|---------------|--------|----|----|
| JP | 2014-183148 A | 9/2014 | | |
| WO | WO-2018051656 A1 * | 3/2018 | ............... | H01G 2/10 |
| WO | WO-2019087852 A1 * | 5/2019 | ............ | H02M 7/003 |

* cited by examiner

CAPACITOR MODULE AND POWER CONVERSION APPARATUS

CROSS-REFERENCE TO RELATED APPLICATION

This application is the U.S. bypass application of International Application No. PCT/JP2020/048079 filed on Dec. 23, 2020 which designated the U.S. and claims priority to Japanese Patent Application No. 2020-009697 filed on Jan. 24, 2020, the contents of both of which are incorporated herein by reference.

TECHNICAL FIELD

The present disclosure relates to a capacitor module and a power conversion apparatus.

BACKGROUND

Conventionally, a power conversion apparatus that converts DC power from a battery into AC power is mounted on an electric vehicle, a hybrid vehicle, and the like, to drive a motor for vehicle traveling. JP 2015-170771 A discloses a power conversion apparatus including a plurality of semiconductor modules that incorporate semiconductor devices, and a capacitor module that is electrically connected to the plurality of semiconductor modules, as an example of this type of power conversion apparatus.

SUMMARY

One aspect of the present disclosure is a capacitor module including a capacitor element, a plurality of connection terminals for electrically connecting the capacitor element to other equipment, and an exterior coating that includes a resin film having electrical insulating property and wraps the capacitor element except the plurality of connection terminals. The exterior coating is formed by joining a plurality of joining pieces constituting the resin film to all outer surfaces of the capacitor element so that the plurality of joining pieces butt each other when in an unfolded state, and the plurality of connection terminals are constituted to protrude through one of protrusion openings that are formed by notches provided in advance in at least one of the plurality of joining pieces when the plurality of joining pieces are butted, and protrusion openings provided in advance to penetrate at least one of the plurality of joining pieces, or protrude through only protrusion openings formed by notches provided in advance in at least one of the plurality of joining pieces when the plurality of joining pieces are butted.

BRIEF DESCRIPTION OF THE DRAWINGS

The above features of the present disclosure will be made clearer by the following detailed description, given referring to the appended drawings. In the accompanying drawings.

DETAILED DESCRIPTION OF THE PREFERRED EMBODIMENTS

In the above-described conventional power conversion apparatus, the capacitor module is fixed with a resin seal material for potting that fills a container in a state where a capacitor element is accommodated in the container. According to such a capacitor module, the capacitor element is electrically insulated by the resin seal material. Typically, in a case where a structure in which the container is filled with the resin seal material is employed in this type of capacitor module, a problem can arise the overall size of the capacitor module increase.

The present disclosure is directed to providing a small capacitor module.

One aspect of the present disclosure is a capacitor module including a capacitor element, a plurality of connection terminals for electrically connecting the capacitor element to other equipment, and an exterior coating that includes a resin film having electrical insulating property and wraps the capacitor element except the plurality of connection terminals. The exterior coating is formed by joining a plurality of joining pieces constituting the resin film to all outer surfaces of the capacitor element so that the plurality of joining pieces butt each other when in an unfolded state, and the plurality of connection terminals are constituted to protrude through one of protrusion openings that are formed by notches provided in advance in at least one of the plurality of joining pieces when the plurality of joining pieces are butted, and protrusion openings provided in advance to penetrate at least one of the plurality of joining pieces, or protrude through only protrusion openings formed by notches provided in advance in at least one of the plurality of joining pieces when the plurality of joining pieces are butted.

In the above-described aspect, the capacitor module is constituted so that the capacitor element is wrapped by the exterior coating that is constituted with the resin film having electrical insulating property. In this event, the capacitor element is wrapped by the exterior coating except the plurality of connection terminals for electrically connecting with another equipment. Thus, an outer surface of the capacitor module is formed with the exterior coating. By employing a structure in which the capacitor element is wrapped by the exterior coating in this manner, a size of the capacitor module substantially matches a size of the capacitor element itself. This can prevent a size of the whole capacitor module from becoming large and can achieve a smaller capacitor module compared to a structure in which the capacitor element is accommodated in a container and sealed with a resin seal material for potting.

As described above, according to the above-described aspect, it is possible to provide a small capacitor module.

Embodiments according to a power conversion apparatus will be described below with reference to the drawings. The power conversion apparatus is constituted as an in-vehicle power conversion apparatus that is mounted on a vehicle such as an electric vehicle and a hybrid vehicle, and converts power between DC power and AC power.

Note that in the present specification, unless otherwise specified, an X axis direction is set as a first direction X, a Y axis direction is set as a second direction Y, and a Z axis direction is set as a third direction Z. Further, upward and downward directions of a power conversion apparatus 1 are not particularly limited because the upward and downward directions of the power conversion apparatus 1 can change in accordance with arrangement. However, in the following description, the Z axis direction is set as the upward direction of the power conversion apparatus 1 for explanatory convenience.

First Embodiment

Figure 1:
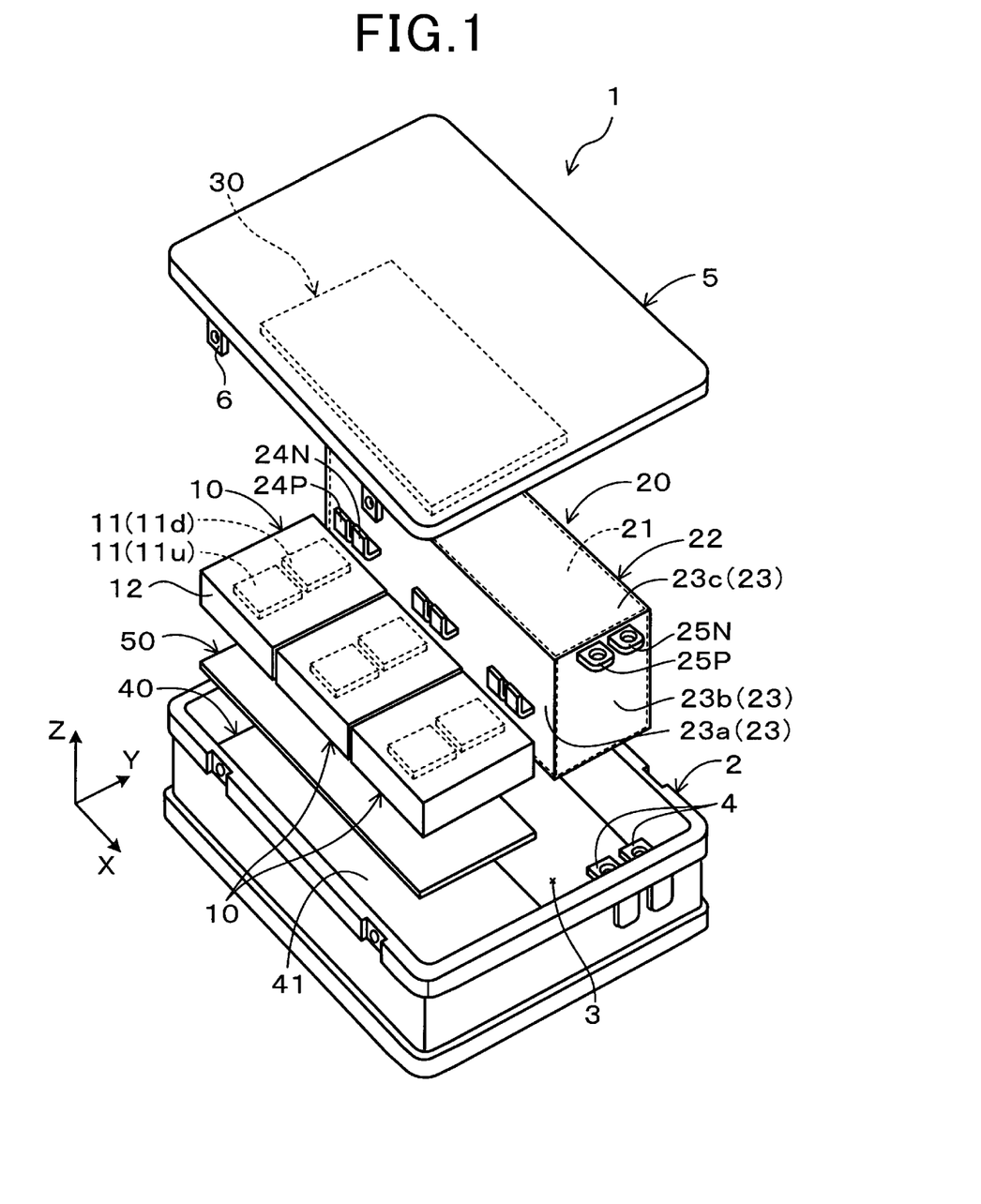
FIG. 1 is an exploded perspective view of a power conversion apparatus according to a first embodiment.
Figure 2:
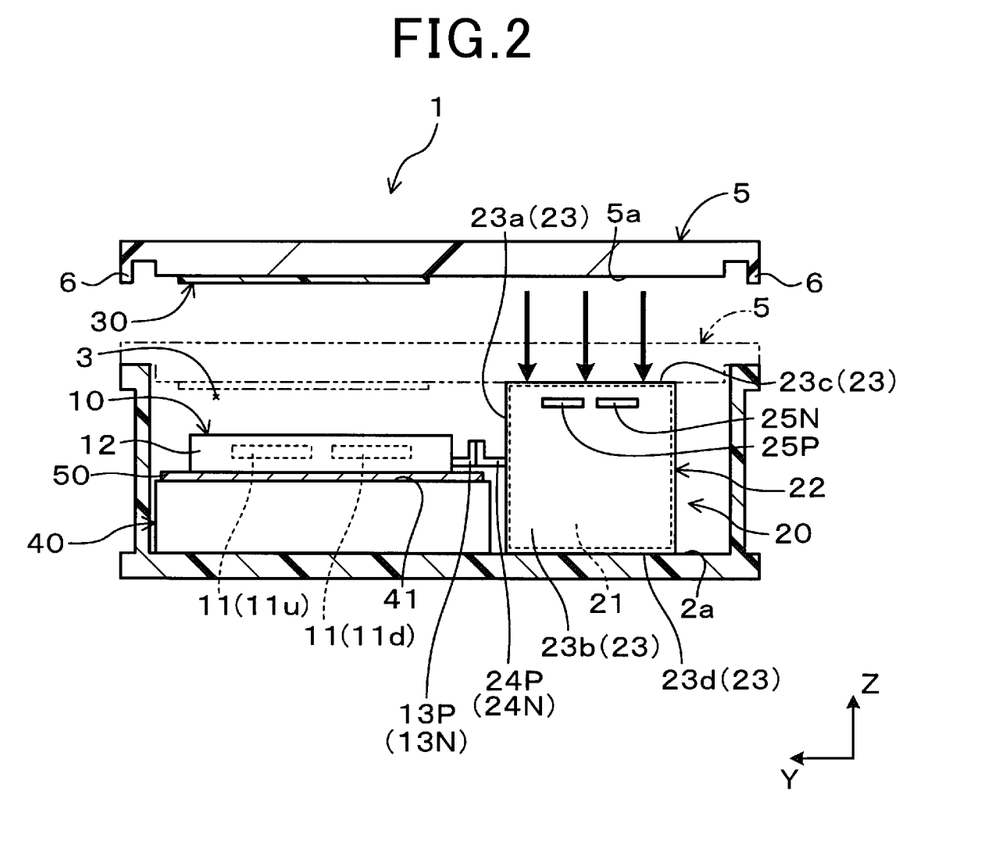
FIG. 2 is a cross-sectional diagram of the power conversion apparatus in FIG. 1 taken along a cut surface defined by a Y axis and a Z axis.

As illustrated in FIG. 1 and FIG. 2, the power conversion apparatus 1 according to the first embodiment includes a case 2, a cover 5, a plurality of semiconductor modules 10, a capacitor module 20, a control circuit substrate 30, a cooler 40, and a heat dissipating member 50.

The cover 5 is to be attached to the case 2. Thus, the cover 5 includes a plurality of attachment portions 6, and each attachment portion 6 is fastened and fixed to the case 2 using a bolt member (not illustrated). Note that it is also possible to employ a mechanical joined structure, which is so-called snap-fit, in which each attachment portion 6 is fixed to the case 2 by being fitted using elastic deformation of each attachment portion 6 in place of such a fastened and fixed structure. The control circuit substrate 30 is fixed to a rear surface 5a of the cover 5 (refer to FIG. 2).

The case 2 is constituted as an accommodation body having an upper opening. A sealed accommodation space 3 is formed in a state where the cover 5 is attached to this case 2. In this accommodation space 3, the plurality of semiconductor modules 10, the capacitor module 20, the control circuit substrate 30, the cooler 40 and the heat dissipating member 50 are accommodated.

Two relay bus bars 4 for electrically connecting two connection terminals (a second positive terminal 25P and a second negative terminal 25N which will be described later) of the capacitor module 20 respectively to a positive electrode side and a negative electrode side of a power supply B are provided in the case 2. The two connection terminals are fastened and fixed to the two relay bus bars 4 using a bolt member (not illustrated).

While materials of the case 2 and the cover 5 are not particularly limited, a resin material can be used as an example to reduce weight and enhance electrical insulating property of accommodated elements accommodated in the accommodation space 3.

In the present embodiment, three semiconductor modules 10 having the same structure are provided as the plurality of semiconductor modules 10. The three semiconductor modules 10 are juxtaposed in the first direction X. Each semiconductor module 10 includes two semiconductor devices 11. Note that the number of the semiconductor modules 10 and the number of the semiconductor devices 11 are not particularly limited and can be appropriately changed as necessary.

The semiconductor device 11 has a substantially planar shape having a thickness direction in the third direction Z. Typically, an arbitrary semiconductor device such as an IGBT (that is, an insulated gate bipolar transistor) and a MOSFET (that is, a metal-oxide semiconductor field-effect transistor) is used as this semiconductor device 11.

A body portion 12 is mainly constituted with a resin material and incorporates two semiconductor devices 11 (an upper arm semiconductor device 11u and a lower arm semiconductor device 11d). This body portion 12 forms a substantially rectangular parallelopiped shape having a thickness direction in the third direction Z. The upper arm semiconductor device 11u and the lower arm semiconductor device 11d are juxtaposed adjacent to each other in the second direction Y.

The capacitor module 20 of the first embodiment is electrically connected to the semiconductor modules 10 including the semiconductor devices 11. This capacitor module 20 is disposed so as to face three semiconductor modules 10 in the second direction Y and includes a capacitor element 21 of a smoothing capacitor and an exterior coating 22 that wraps this capacitor element 21.

The capacitor element 21 is typically constituted with a dielectric film wound around a winding shaft. Note that in place of this, a laminated structure in which a plurality of films are laminated can be employed.

The exterior coating 22 is constituted with a resin film having at least electrical insulating property and is constituted by this resin film being joined around the capacitor element 21. In this event, the capacitor element 21 is wrapped by the resin film except a portion where a plurality of connection terminals which will be described later protrude.

The "resin film" described here widely incorporates thin materials manufactured from resin materials. The resin film may be constituted with one type of film or may be constituted by superimposing a plurality of types of film, which is a so-called "laminated film".

Note that a form of the resin film is not particularly limited, and a resin film in a sheet shape or in a bag shape can be appropriately used.

Further, a method for joining the resin film is not particularly limited, and typically, a method in which the resin film is directly pasted to the capacitor element 21 with an adhesive, a method in which overlapping portions of end faces of the resin film that wraps the capacitor element 21 are bonded with each other with an adhesive, a method in which packing is performed by utilizing heat-shrinkable property of the resin film, or the like, can be employed.

According to this exterior coating 22, electrical insulating property of the capacitor element 21 can be ensured. Further, this resin film preferably has moisture resistance in addition to electrical insulating property. This can achieve both electrical insulating property and moisture resistance of the capacitor element 21.

Here, the capacitor element 21 forms a substantially hexahedral shape having a longitudinal direction in the first direction X. Thus, the exterior coating 22 that wraps the capacitor element 21 has six outer surfaces 23 that form an exterior portion of the capacitor module 20. The outer surfaces 23 are also coated surfaces of the capacitor element 21.

The capacitor module 20 includes a plurality of connection terminals for electrically connecting the capacitor element 21 to three semiconductor modules 10 that are another equipment. The plurality of connection terminals include three pairs of a first positive terminal 24P and a first negative terminal 24N, and one pair of a second positive terminal 25P and a second negative terminal 25N for electrically connecting the capacitor element 21 to the power supply B (see FIG. 4) that is another equipment.

The first positive terminal 24P is electrically connected to a positive terminal 13P of each semiconductor module 10, and the first negative terminal 24N is electrically connected to a negative terminal 13N of each semiconductor module 10 (see FIG. 2). The first positive terminal 24P and the first negative terminal 24N are adjacent to each other in the first direction X.

The second positive terminal 25P is electrically connected to one relay bus bar 4 provided in the case 2, and the second negative terminal 25N is electrically connected to the other relay bus bar 4 provided in the case 2 (see FIG. 1). The second positive terminal 25P and the second negative terminal 25N are adjacent to each other in the second direction Y.

In the capacitor module 20, three pairs of the first positive terminal 24P and the first negative terminal 24N that are part of the plurality of connection terminals protrude in the second direction Y through protrusion openings 22f (see FIG. 3) that penetrate a first outer surface 23a among the plurality of outer surfaces 23 of the exterior coating 22.

Further, in the capacitor module 20, one pair of the second positive terminal 25P and the second negative terminal 25N that are the rest of the plurality of connection terminals protrude in the first direction X through protrusion openings 22g (see FIG. 3) that penetrate a second outer surface 23b that is different from the first outer surface 23a among the plurality of outer surfaces 23 of the exterior coating 22.

The first outer surface 23a is a plane defined by the first direction X and the third direction Z. The second outer surface 23b is a plane defined by the first direction X and the second direction Y. The first outer surface 23a and the second outer surface 23b are orthogonal to each other.

The control circuit substrate 30 is electrically connected to a control terminal (not illustrated) of each semiconductor module 10 and has a function of performing switching control of each semiconductor device 11.

The cooler 40 is constituted as a cooling unit that cools the three semiconductor modules 10 by utilizing a cooling medium (hereinafter, simply referred to as a "refrigerant"). The cooler 40 has a cooling surface 41 that is cooled by the refrigerant that flows through a refrigerant flow path (not illustrated) within a metal housing.

As a typical refrigerant to be used in this cooler 40, water in which an ethylene glycol antifreeze solution is mixed, a natural refrigerant such as water and ammonia, a fluorocarbon refrigerant such as Fluorinert, a fluorocarbon refrigerant such as HCFC123 and HFC134a, an alcoholic refrigerant such as methanol and alcohol, a ketone refrigerant such as acetone, or the like, can be employed.

The heat dissipating member 50 is constituted with a heat conduction sheet (typically, a silicon sheet, an elastomer sheet (styrene series, acrylic series), a graphite sheet, or the like) having a thickness direction in the third direction Z. This heat dissipating member 50 is constituted to intervene between the cooling surface 41 of the cooler 40 and the body portion 12 of each semiconductor module 10 in the third direction Z to efficiently transfer heat generated from each semiconductor module 10 to the cooler 40. In other words, one surface (upper surface) of the heat dissipating member 50 abuts on the body portion 12 of each semiconductor module 10, and the other surface (lower surface) of the heat dissipating member 50 abuts on the cooling surface 41 of the cooler 40.

As illustrated in FIG. 2, in a case where the cover 5 is attached to the case 2, the capacitor module 20 is accommodated in the accommodation space 3 so that the outer surface 23d on a lower side of the capacitor module 20 directly abuts on a bottom surface 2a of the case 2. Then, the cover 5 is fastened and fixed to the case 2 at the plurality of attachment portions 6 in a state where the cover 5 covers the case 2 so as to block the upper opening of the case 2. By this means, the rear surface 5a of the cover 5 faces the outer surface 23c on an upper side of the capacitor module 20 and directly abuts on the outer surface 23c.

The cover 5 is pressed against the capacitor module 20 by attachment of the cover 5 to the case 2, which causes the cover 5 to provide downward pressing force (see an arrow in FIG. 2) to the capacitor module 20. In other words, the outer surface 23c on the upper side of the capacitor module 20 is pressed downward by the rear surface 5a of the cover 5. Then, the pressing force provided to the capacitor module 20 from the cover 5 is received on the bottom surface 2a of the case 2.

Thus, the capacitor module 20 is disposed between the case 2 and the cover 5 in the third direction Z and is fixed to the bottom surface 2a of the case 2 by pressure being applied by the pressing force directly received from the cover 5 attached to the case 2. As a result, the capacitor module 20 is directly fixed to the case 2. In this event, to increase an area where the capacitor module 20 is fixed to the case 2 by pressure being applied, both the outer surface 23d of the capacitor module 20 and the bottom surface 2a of the case 2 are preferably flat surfaces.

Figure 3:
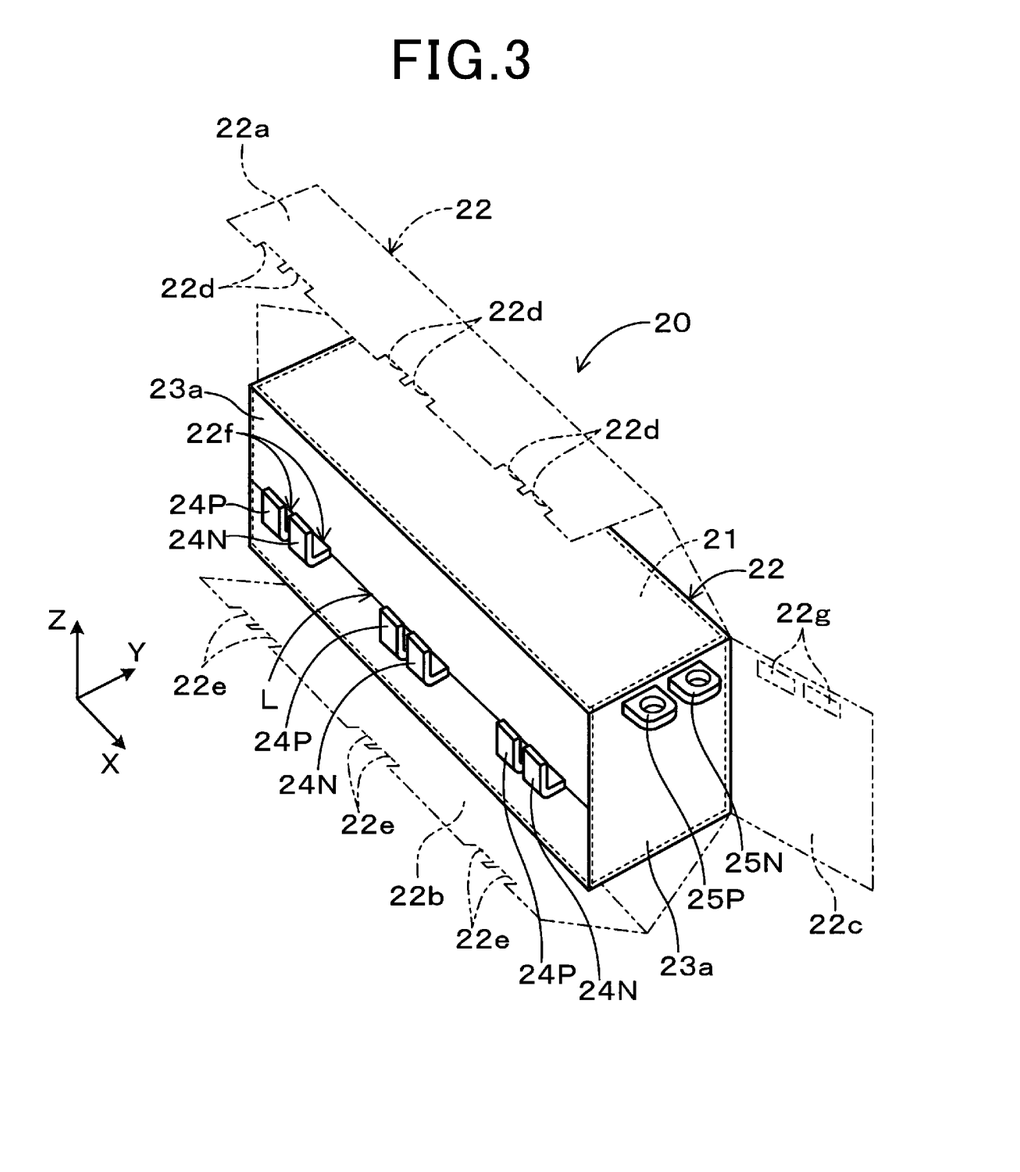
FIG. 3 is a perspective view illustrating a capacitor module in FIG. 1 in a state where an exterior coating is unfolded.

As illustrated in FIG. 3, as an example of the exterior coating 22 of the capacitor module 20, the exterior coating 22 can be constituted with one resin film having a plurality of joining pieces. In a case of this exterior coating 22, the first outer surface 23a is formed by joining a first joining piece 22a and a second joining piece 22b to the capacitor element 21 so that the first joining piece 22a and the second joining piece 22b butt each other on a butt line L. Further, the second outer surface 23b is formed by joining a third joining piece 22c to the capacitor element 21. Note that FIG. 3 illustrates an example of a state where the exterior coating 22 is unfolded, and a shape of details of the exterior coating 22 can be appropriately changed in accordance with a method for joining the exterior coating 22 to be actually employed, and the like.

When the first joining piece 22a and the second joining piece 22b are butted, six rectangular protrusion openings 22f are formed by six rectangular notches 22d provided in advance in the first joining piece 22a and six rectangular notches 22e provided in advance in the second joining piece 22b. Thus, when the first joining piece 22a and the second joining piece 22b are joined to the capacitor element 21, the first positive terminal 24P or the first negative terminal 24N is inserted in each of these six protrusion openings 22f.

Two protrusion openings 22g are provided in advance to penetrate through the third joining piece 22c. Thus, when the third joining piece 22c is joined to the capacitor element 21, the second positive terminal 25P or the second negative terminal 25N is inserted into each of the two protrusion openings 22g.

Note that, as a reference embodiment, in place of the exterior coating 22 in FIG. 3, a plurality of resin films obtained by separating one resin film can be used. In this case, the plurality of resin films are joined to the capacitor element 21.

Other than a method in which rectangular protrusion openings 22f are formed by concave notches 22d and concave notches 22e, rectangular protrusion openings 22f may be formed without using one of the notches 22d and the notches 22e. For example, when the first joining piece 22a having the notches 22d and the second joining piece 22b that does not have portions like the notches 22e are butted each other, rectangular spaces defined by the concave notches 22d of the first joining piece 22a and flat end faces of the second joining piece 22b may be set as protrusion openings 22f. Further, the protrusion openings 22g of the third joining piece 22c may also be formed by utilizing notches in a similar manner to the protrusion openings 22f.

Figure 4:
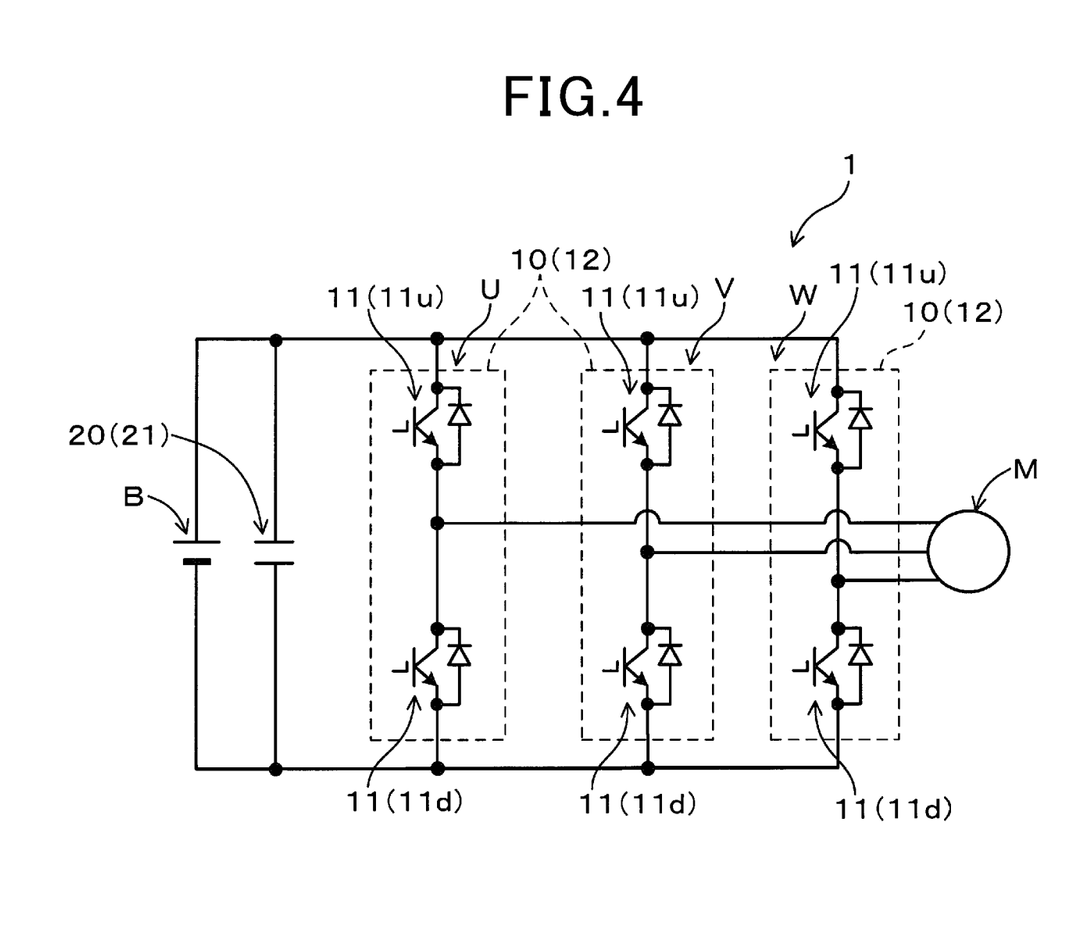
FIG. 4 is an inverter circuit diagram of the power conversion apparatus in FIG. 1.

As illustrated in FIG. 4, an inverter circuit of the power conversion apparatus 1 is a three-phase inverter having a U phase, a V phase and a W phase connected in parallel between the positive electrode side and the negative electrode side of the power supply B. Two semiconductor devices 11 incorporated into the body portion 12 include the upper arm semiconductor device 11u and the lower arm semiconductor device 11d connected in series to each other.

The upper arm semiconductor device 11u is electrically connected to a high potential side terminal of the power supply B. The lower arm semiconductor device 11d is electrically connected to a low potential side terminal of the power supply B. A connection point of the upper arm semiconductor device 11u and the lower arm semiconductor device 11d is connected to three electrodes of a motor M as power equipment via an output bus bar 18 and a three-phase connector (not illustrated). Further, a flywheel diode is connected in reverse-parallel to each semiconductor device 11.

Operational effects of the above-described first embodiment will be described next.

According to the first embodiment, the capacitor module 20 is constituted such that the capacitor element 21 is wrapped by the exterior coating 22 constituted with a resin film having electrical insulating property. In this event, the capacitor element 21 is wrapped by the exterior coating 22 except the plurality of connection terminals (24P, 24N, 25P, 25N) for electrically connecting with the semiconductor module 10 and the power supply B that are another equipment. Thus, the outer surface 23 of the capacitor module 20 is formed by the exterior coating 22.

By employing a structure in which the capacitor element 21 is wrapped by the exterior coating 22 in this manner, a size of the capacitor module 20 substantially matches a size of the capacitor element 21 itself. This can prevent a size of the whole capacitor module 20 from becoming larger and achieve a smaller capacitor module 20 compared to a structure in which the capacitor element 21 is accommodated in a container and sealed with a resin seal material for potting.

It is therefore possible to provide a small capacitor module 20 according to the first embodiment. Further, as well as the capacitor module 20, the power conversion apparatus 1 can also be made smaller.

According to the above-described power conversion apparatus 1, by constituting the capacitor module 20 using the exterior coating 22 constituted with a resin film, it is possible to simplify an exterior structure for the capacitor element 21, so that it is possible to provide an effect of achieving reduction in weight and cost.

According to the above-described power conversion apparatus 1, by fixing the capacitor module 20 to the case 2 by utilizing pressing force received at the capacitor module 20 by the cover 5, it is possible to omit fixing means such as a bolt member, so that it is possible to simplify a structure for fixing the capacitor module 20.

According to the above-described power conversion apparatus 1, an area where the capacitor module 20 is fixed by pressure being applied can be increased by pressing the flat outer surface 23d of the capacitor module 20 against the flat bottom surface 2a of the case 2. It is therefore possible to obtain the desired force for fixing the capacitor module 20 to the case 2 without using another fixing means.

Note that a structure in which another member intervenes between the capacitor module 20 and the bottom surface 2a of the case 2 can be employed as a modified example particularly related to the above-described first embodiment.

Other embodiments related to the above-described first embodiment will be described below with reference to the drawings. In other embodiments, the same reference numerals will be assigned to components that are the same as the components in the first embodiment, and description regarding the same components will be omitted.

Second Embodiment

Figure 5:
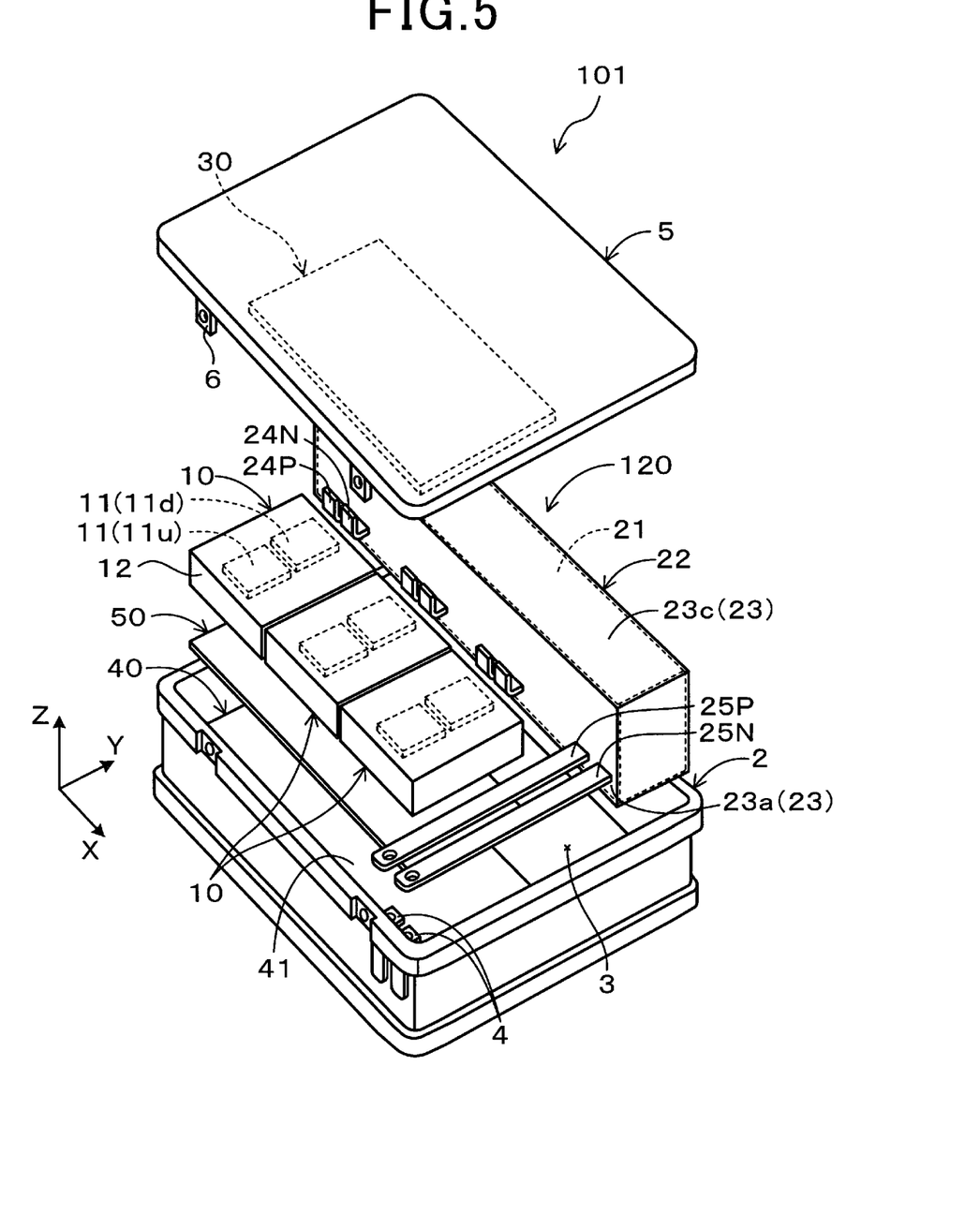
FIG. 5 is an exploded perspective view of a power conversion apparatus according to a second embodiment corresponding to FIG. 1.

As illustrated in FIG. 5, a power conversion apparatus 101 of a second embodiment is different from the power conversion apparatus in the first embodiment in a configuration of the capacitor module 120.

The outer surface 23a of the exterior coating 22 of the capacitor module 120 is formed by joining the first joining piece 22a and the second joining piece 22 to the capacitor element 21 so that the first joining piece 22a and the second joining piece 22b butt each other on the butt line L.

Figure 6:
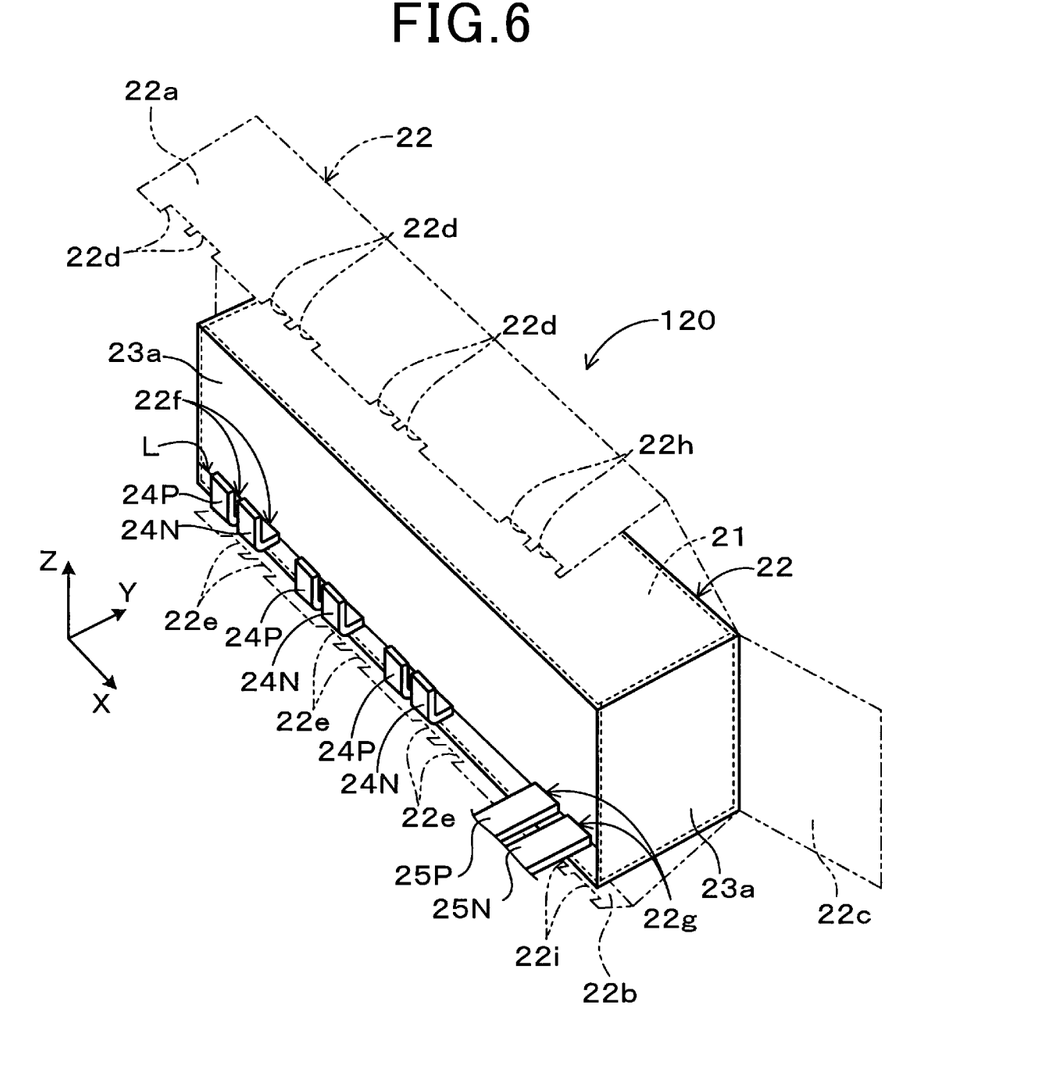
FIG. 6 is a perspective view illustrating a capacitor module in FIG. 5 in a state where an exterior coating is unfolded.

As illustrated in FIG. 6, in a similar manner to a case of the first embodiment, six rectangular protrusion openings 22f are formed by six rectangular notches 22d provided in advance in the first joining piece 22a and six rectangular notches 22e provided in advance in the second joining piece 22b. Thus, when the first joining piece 22a and the second joining piece 22b are joined to the capacitor element 21, the first positive terminal 24P or the first negative terminal 24N is inserted into each of the six protrusion openings 22f.

Further, in a similar manner to the protrusion openings 22f, two protrusion openings 22g are formed by two rectangular notches 22h provided in advance in the first joining piece 22a and two rectangular notches 22i provided in advance in the second joining piece 22b. Thus, when the first joining piece 22a is joined to the capacitor element 21, the second positive terminal 25P or the second negative terminal 25N is inserted into each of the two protrusion openings 22g.

In this manner, the capacitor module 120 is constituted so that all of the plurality of connection terminals (the first positive terminal 24P, the first negative terminal 24N, the second positive terminal 25P and the second negative terminal 25N) protrude through the protrusion openings 22f and 22g that penetrate the same outer surface 23a among the plurality of outer surfaces 23 of the exterior coating 22. Note that FIG. 6 illustrates an example of a state where the exterior coating 22 is unfolded, and a shape of details of the exterior coating 22 can be appropriately changed in accordance with a method for joining the exterior coating 22 to be actually employed, and the like.

Other points are the same as those in the first embodiment.

According to the power conversion apparatus 101 of the second embodiment, by causing all the connection terminals to protrude from the same outer surface 23a, it is possible to make other outer surfaces 23, flat surfaces where connection terminals do not protrude. It is therefore possible to reduce the number of outer surfaces where connection terminals protrude to one, so that a shape of the exterior coating 22 to be joined to the capacitor element 21 can be made simpler compared to a shape in the first embodiment. This results in reducing man-hours and time required for work of wrapping the capacitor element 21 with the exterior coating 22.

In addition, operational effects the same as those in the first embodiment are provided.

Third Embodiment

Figure 7:
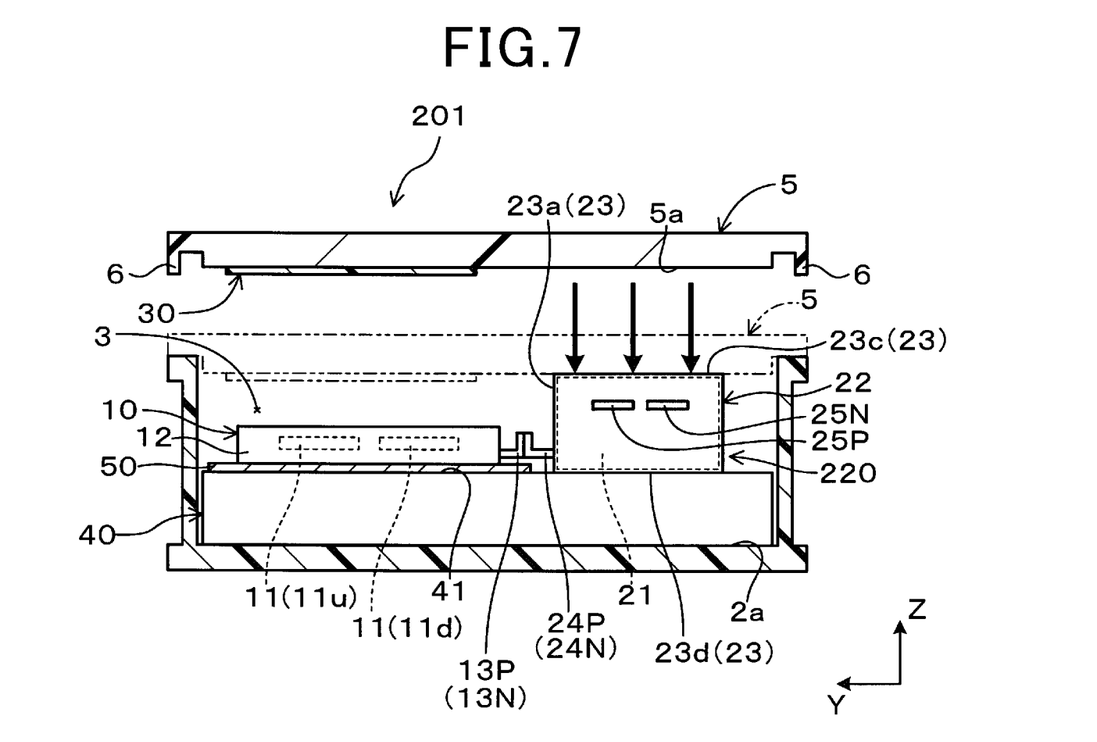
FIG. 7 is a cross-sectional diagram of a power conversion apparatus according to a third embodiment taken along a cut surface defined by a Y axis and a Z axis.

As illustrated in FIG. 7, a power conversion apparatus 201 of the third embodiment is different from the power conversion apparatus in the first embodiment in configurations of a capacitor module 220 and the cooler 40.

In this power conversion apparatus 201, the cooler 40 is constituted so that the cooling surface 41 also abuts on the exterior coating 22 of the capacitor module 220 in addition to the body portion 12 of each semiconductor module 10. In other words, the cooler 40 is constituted as a cooling unit that cools all of the three semiconductor modules 10 and the capacitor module 220.

The capacitor module 220 is pressed against the cooling surface 41 of the cooler 40 by downward pressing force received at the capacitor module 220 from the cover 5, and the cooler 40 is further pressed against the bottom surface 2a of the case 2. In this event, the capacitor module 220 is biased in a direction (downward in FIG. 7) of being pressed against the cooling surface 41 by the pressing force received from the cover 5. Thus, the capacitor module 220 is indirectly fixed to the case 2 in a state where the cooler 40 is disposed between the capacitor module 220 and the case 2 by utilizing the pressing force directly received from the cover 5 attached to the case 2.

Other points are the same as those in the first embodiment.

According to the power conversion apparatus 201 of the third embodiment, the capacitor module 220 can be fixed by being pressed against the cooling surface 41 by the pressing force received from the cover 5 in a state where the outer surface 23d on a lower side of the capacitor module 220 is made to directly abut on the cooling surface 41 of the cooler 40. This can increase a degree of adhesion between the capacitor module 220 and the cooling surface 41 of the cooler 40, so that it is possible to improve cooling efficiency of the capacitor module 220.

Further, a resin seal material for potting is not used to construct the capacitor module 220, so that it is possible to reduce heat resistance that can occur in a case where a resin seal material for potting is used, which can further improve cooling efficiency of the capacitor module 220.

In addition, operational effects the same as those in the first embodiment are provided.

Note that as a modified example particularly related to the above-described third embodiment, it is possible to employ a structure (characteristic structure of the above-described second embodiment) in which all of the plurality of connection terminals (the first positive terminal 24P, the first negative terminal 24N, the second positive terminal 25P and the second negative terminal 25N) are caused to protrude from the same outer surface 23a of the capacitor module 220.

While the present disclosure has been described with reference to the examples, it should be understood that the present disclosure is not limited to the examples and structures. The present disclosure incorporates various modified examples and modifications within an equivalent range. In addition, various combinations, forms, and other combinations and forms including only one element or more or less elements fall within the scope and the concept of the present disclosure.

While an example has been described in the above-described embodiments where the capacitor modules 20, 120 and 220 directly receive the pressing force from the cover 5 attached to the case 2, another member such as a spacer may intervene between the cover 5 and the capacitor modules 20, 120 and 220 if the pressing force can be provided to the capacitor modules 20, 120 and 220. In this case, the capacitor modules 20, 120 and 220 indirectly receive the pressing force of the cover 5 via another member. Further, another fixing means can be added as necessary to fix the capacitor modules 20, 120 and 220 to the case 2.

What is claimed is:

1. A capacitor module comprising:
   a capacitor element;
   a plurality of connection terminals for electrically connecting the capacitor element to other equipment; and
   an exterior coating that includes a resin film having electrical insulating property and wraps the capacitor element except the plurality of connection terminals, wherein
   the exterior coating is formed by joining a plurality of joining pieces constituting the resin film to all outer surfaces of the capacitor element so that the plurality of joining pieces butt each other when in an unfolded state, and
   the plurality of connection terminals are constituted to protrude through one of protrusion openings that are formed by notches provided in advance in at least one of the plurality of joining pieces when the plurality of joining pieces are butted, and protrusion openings provided in advance to penetrate at least one of the plurality of joining pieces, or protrude through only protrusion openings formed by notches provided in advance in at least one of the plurality of joining pieces when the plurality of joining pieces are butted.

2. The capacitor module according to claim 1, wherein the plurality of connection terminals are constituted so that part of connection terminals protrudes through the protrusion openings that penetrate a first outer surface among a plurality of outer surfaces of the exterior coating, and the rest of the connection terminals protrudes through the protrusion openings that penetrate a second outer surface among the plurality of outer surfaces of the exterior coating.

3. The capacitor module according to claim 1, wherein the plurality of connection terminals are constituted so that all the connection terminals protrude through the protrusion openings that penetrate the same outer surface among the plurality of outer surfaces of the exterior coating.

4. A power conversion apparatus comprising:
   the capacitor module according to claim 1;
   a case that accommodates the capacitor module; and
   a cover to be attached to the case, wherein
   the capacitor module is fixed to the case by utilizing pressing force received at the capacitor module from the cover attached to the case.

5. The power conversion apparatus according to claim 4, further comprising:
   a cooling unit having a cooling surface that abuts on the exterior coating of the capacitor module, wherein
   the capacitor module is biased in a direction in which the exterior coating is pressed against the cooling surface by the pressing force received from the cover.

* * * * *